United States Patent
Zhang

(10) Patent No.: US 10,001,763 B2
(45) Date of Patent: Jun. 19, 2018

(54) CONTROL DEVICE AND METHOD FOR CONTROLLING INTELLIGENT DEVICE

(71) Applicant: Lenovo (Beijing) Co., Ltd., Beijing (CN)

(72) Inventor: Jinfeng Zhang, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 255 days.

(21) Appl. No.: 14/755,496

(22) Filed: Jun. 30, 2015

(65) Prior Publication Data

US 2016/0266558 A1 Sep. 15, 2016

(30) Foreign Application Priority Data

Mar. 9, 2015 (CN) .......................... 2015 1 0103702

(51) Int. Cl.
   *G05B 15/02* (2006.01)
   *G06N 5/02* (2006.01)

(52) U.S. Cl.
   CPC ...... *G05B 15/02* (2013.01); *G05B 2219/2642* (2013.01); *G06N 5/025* (2013.01)

(58) Field of Classification Search
   CPC ............ G05B 15/02; G05B 2219/2642; G05B 13/026; G05N 5/046; G06N 5/025; H02J 3/28; H02J 3/00; H02J 3/12; H02J 13/0006; H02J 3/01; H02J 3/382; G05F 1/66; H02M 1/42
   USPC ........................................................ 700/275
   See application file for complete search history.

(56) References Cited

U.S. PATENT DOCUMENTS

| | | | | | |
|---|---|---|---|---|---|
| 5,510,975 | A  * | 4/1996 | Ziegler, Jr. | ........... | G05B 13/028 700/49 |
| 6,237,854 | B1 * | 5/2001 | Avni | ...................... | F24F 11/001 165/236 |
| 7,891,203 | B1 * | 2/2011 | Burns | ................ | B60H 1/00592 62/115 |
| 7,925,383 | B2 * | 4/2011 | Kwon | .................... | F24F 11/006 700/19 |
| 8,490,006 | B1 * | 7/2013 | Reeser | .................. | G05B 15/02 700/18 |
| 9,076,111 | B2 * | 7/2015 | Delorme | ................ | G06Q 10/06 |
| 9,311,586 | B2 * | 4/2016 | Robinette | .......... | G08B 13/1427 |
| 2006/0064720 | A1 * | 3/2006 | Istvan | ................ | H04N 5/44543 725/38 |
| 2006/0142968 | A1 * | 6/2006 | Han | ...................... | A61B 5/0205 702/120 |
| 2008/0094175 | A1 * | 4/2008 | Mullet | ............... | G07C 9/00309 340/5.7 |

(Continued)

*Primary Examiner* — Kenneth M Lo
*Assistant Examiner* — Mohammed Shafayet
(74) *Attorney, Agent, or Firm* — Harness, Dickey & Pierce, P.L.C.

(57) ABSTRACT

A method for controlling intelligent device based on linkage rules and a control device are disclosed. The method includes: executing a first linkage rule based on a first parameter of a first condition device to control a first response device to be in a first state; determining that the first response device switches from the first state to a second state different from the first state; disabling the first linkage rule; determining a second linkage rule among a plurality of linkage rules based on the second state of the first response device, the second linkage rule is provided to control the first response device to be in the second state; and setting a third linkage rule.

11 Claims, 3 Drawing Sheets

(56) References Cited

U.S. PATENT DOCUMENTS

| | | | | |
|---|---|---|---|---|
| 2008/0186148 A1* | 8/2008 | Kwon | F24F 11/006 | 340/286.02 |
| 2009/0121842 A1* | 5/2009 | Elberbaum | G08C 17/02 | 340/10.5 |
| 2010/0077175 A1* | 3/2010 | Wu | G06F 3/0611 | 711/172 |
| 2011/0157476 A1* | 6/2011 | Arling | H04L 12/2805 | 348/731 |
| 2012/0065802 A1* | 3/2012 | Seeber | G06F 1/3203 | 700/295 |
| 2013/0066474 A1* | 3/2013 | Coogan | F24F 11/0012 | 700/278 |
| 2013/0073094 A1* | 3/2013 | Knapton | F24F 11/0034 | 700/278 |
| 2013/0085609 A1* | 4/2013 | Barker | G05B 15/02 | 700/276 |
| 2013/0085615 A1* | 4/2013 | Barker | A61G 10/00 | 700/277 |
| 2013/0131870 A1* | 5/2013 | Zerhusen | A47B 23/046 | 700/275 |
| 2014/0075967 A1* | 3/2014 | Arensmeier | F24F 13/222 | 62/56 |
| 2014/0135998 A1* | 5/2014 | Cao | F24F 11/0012 | 700/278 |
| 2014/0229075 A1* | 8/2014 | Lopez | B60H 1/0065 | 701/45 |
| 2014/0306833 A1* | 10/2014 | Ricci | B60Q 1/00 | 340/901 |
| 2014/0309789 A1* | 10/2014 | Ricci | B60Q 1/00 | 700/276 |
| 2014/0316583 A1* | 10/2014 | Ambriz | F24F 11/0012 | 700/277 |
| 2014/0334653 A1* | 11/2014 | Luna | G05B 15/02 | 381/332 |
| 2015/0060557 A1* | 3/2015 | Lau | F24F 11/0012 | 236/44 C |
| 2015/0283878 A1* | 10/2015 | Rose | B60H 1/00735 | 701/36 |
| 2015/0293509 A1* | 10/2015 | Bankowski | G05B 15/02 | 700/275 |
| 2015/0324706 A1* | 11/2015 | Warren | H04L 12/2803 | 700/275 |
| 2016/0070251 A1* | 3/2016 | Brown | G05B 19/4185 | 700/86 |
| 2016/0112240 A1* | 4/2016 | Sundaresan | H04L 67/306 | 726/1 |
| 2016/0160829 A1* | 6/2016 | Park | F01N 9/002 | 701/112 |
| 2016/0187899 A1* | 6/2016 | Lee | G05D 22/02 | 236/44 C |
| 2016/0252266 A1* | 9/2016 | Ushirosako | F24D 19/1084 | 700/278 |
| 2016/0364313 A1* | 12/2016 | Roth | G06F 11/3062 | |
| 2017/0076263 A1* | 3/2017 | Bentz | F24F 11/0086 | |

* cited by examiner

CONTROL DEVICE AND METHOD FOR CONTROLLING INTELLIGENT DEVICE

CROSS REFERENCE TO RELATED APPLICATION

The present application claims the priority to Chinese Patent Application No. 201510103702.7, entitled "METHOD FOR CONTROLLING INTELLIGENT HOME BASED ON LINKAGE RULE AND CONTROL DEVICE", filed on Mar. 9, 2015 with the State Intellectual Property Office of People's Republic of China, which is incorporated herein by reference in its entirety.

TECHNICAL FIELD

The disclosure relates to the field of electronic technology, and in particular to a method for controlling intelligent device based on linkage rules and a control device.

BACKGROUND

With the development of science and technology, intelligent control systems such as intelligent home, intelligent transportation, and intelligent surveillance are constantly evolving and spreading, and bring great convenience to the daily work and life of people.

In an intelligent home system, some linkage scenarios are often set, for example, if it is detected that the current indoor air humidity is lower than 30%, the humidifier is turned on; and if it is detected that the current indoor air humidity is higher than 80%, the humidifier is turned off. In some cases, for example, in the case that the user who still thinks that the air is very dry after the humidifier is turned off manually intervenes to turn on the humidifier, the rule of turning off the humidifier once the air humidity is higher than 80% is disabled, to avoid the case that after the user turns on the humidifier, the humidifier is turned off for it is detected that the current air humidity is higher than 80%. In order to recover the disabled rule, it requires the user of the electronic device to manually set recovery or the electronic device automatically recovers after a preset time period.

In the process of implementing the technical solution according to embodiments of the disclosure, it is found that the following technical problems exist in conventional technology.

In conventional technology, for the case that the user of the electronic device is required to manually set the recovery, inconvenience in operation is brought to the user; while for the case that the electronic device automatically recovers after the preset time period, the preset time period may be too long or too short in some specific scenarios. The disabled rule cannot be recovered automatically based on the scenario of the electronic device in both cases.

It may be seen that, the conventional electronic device has the technical problem that the electronic device is not able to automatically recover the disabled rule based on the scenario of the electronic device after the rule for controlling states of the electronic device is disabled.

Further, due to the above technical problem, it requires the user of the electronic device to manually set the recovery or the electronic device automatically recovers based on the preset time in the process of using the electronic device, which causes the problem of poor user experience in the process of using the electronic device.

SUMMARY

In one aspect, a method for controlling intelligent device is provided according to the embodiments of the disclosure. The method includes: executing a first linkage rule based on a first parameter of a first condition device to control a first response device to be in a first state; determining that the first response device switches from the first state to a second state different from the first state; disabling the first linkage rule; determining a second linkage rule among a plurality of linkage rules based on the second state of the first response device, the second linkage rule is executable to control the first response device to enter into the second state; and setting a third linkage rule, where the third linkage rule is to recover the first linkage rule when executing the second linkage rule.

Optionally, after setting the third linkage rule, the method further includes:

executing the second linkage rule based on a second parameter of a second condition device; and recovering the first linkage rule.

Optionally, after recovering the first linkage rule, the method further includes:

deleting the third linkage rule.

Optionally, executing the first linkage rule based on the first parameter of the first condition device to control the first response device to be in the first state includes:

determining whether the first parameter meets a preset condition, and obtaining a first determination result;

controlling the first response device to be in the first state if parameter meets the preset condition.

Optionally, determining that the first response device switches from the first state to the second state different from the first state includes:

after executing the first linkage rule, switch the first response device from the first state to the second state through user intervening.

In another aspect, a control device is provided according to the embodiments of the disclosure. The control device includes:

a housing;

a storage for storing at least one program module; and at least one processor configured to, through running the at least program module, execute a first linkage rule based on a first parameter of a first condition device to control a first response device to be in a first state; determine that the first response device switches from the first state to a second state different from the first state; disable the first linkage rule; determine a second linkage rule among a plurality of linkage rules based on the second state of the first response device, the second linkage rule is executable to control the first response device to enter into the second state; and set a third linkage rule, where the third linkage rule is defined to recover the first linkage rule when executing the second linkage rule.

Optionally, after the processor set the third linkage rule, the at least one processor is further configured to:

execute the second linkage rule based on a second parameter of a second condition device; and recover the first linkage rule.

Optionally, after recovering the first linkage rule, the at least one processor is further configured to delete the third linkage rule.

Optionally, the at least one processor is further configured to: determine whether the first parameter meets the preset condition, and obtain a first determination result; and control the first response device to be in the first state if the first parameter meets the preset condition.

Optionally, the at least one processor is further configured to switch the first response device from the first state to the second state after executing the first linkage rule upon user intervening.

DETAILED DESCRIPTION

Figure 1:
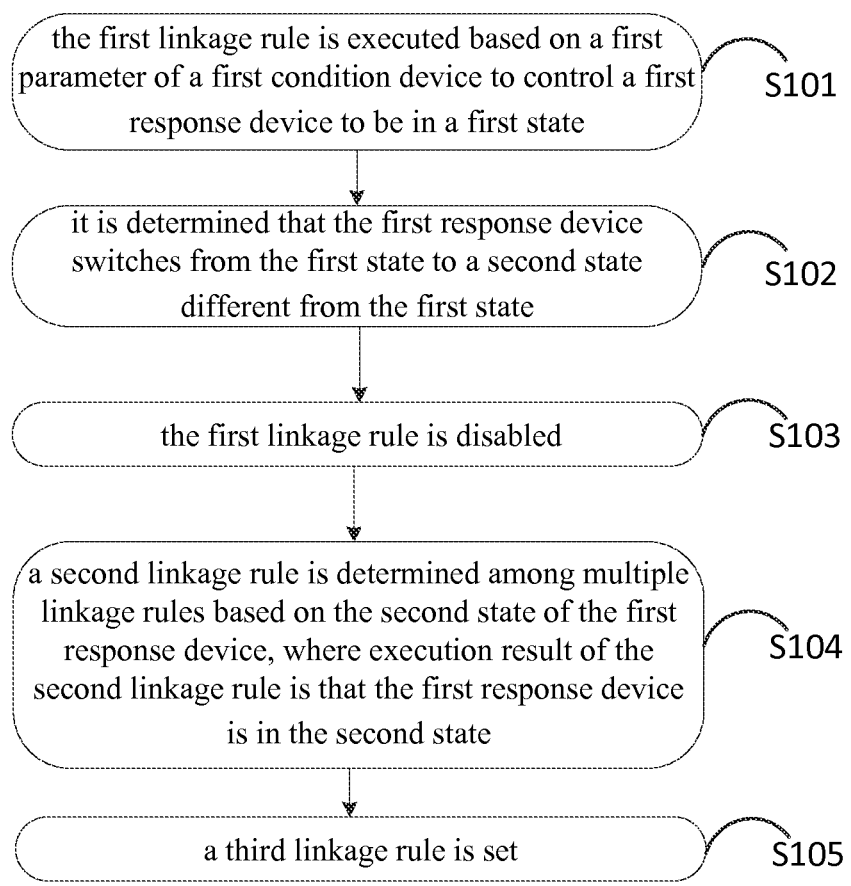
FIG. 1 is a flowchart of a method for controlling intelligent home based on linkage rules according to a first embodiment of the disclosure.

According to the embodiments of the disclosure, the technical problem that the conventional electronic device is not able to automatically recover the disabled rule based on the scenario of the electronic device after the rule for controlling states of the electronic device is disabled is resolved, and the electronic device is allowed to automatically recover the disabled rule based on the scenario of the electronic device.

To solve the above technical problem, the general idea of the technical solution according to the embodiments of the disclosure is as follows:

executing a first linkage rule based on a first parameter of a first condition device to control a first response device to be in a first state;

determining that the first response device switches from the first state to a second state different from the first state;

disabling the first linkage rule;

determining a second linkage rule among multiple linkage rules based on the second state of the first response device, where execution of the second linkage rule results in the first response device to be in the second state; and setting a third linkage rule, where the third linkage rule is to recover the first linkage rule when executing the second linkage rule.

In the above technical solution, the first linkage rule is executed based on the first parameter of the first condition device to control the first response device to be in the first state; it is determined that the first response device switches from the first state to a second state different from the first state; the first linkage rule is disabled; the second linkage rule is determined among multiple linkage rules based on the second state of the first response device, where execution of the second linkage rule results in the first response device to be in the second state; and the third linkage rule is set, where the third linkage rule is to recover the first linkage rule when executing the second linkage rule. In conventional technology, a user of the electronic device needs to manually set the recovery, which brings inconvenience in operation to the user; and for the case that the electronic device automatically recovers based on the preset time period, the preset time period may be too short or too long in some certain scenarios. By contrast, with this solution, the disabled rule may be automatically recovered based on the scenario of the electronic device, and the technical problem that the conventional electronic device is not able to automatically recover the disabled rule based on the scenario condition of the electronic device after the rule for controlling states of the electronic device is disabled is effectively solved, and the electronic device is able to automatically recover the disabled rule based on the scenario condition of the electronic device.

To make the objects, technical solutions and merits of the disclosure more clearly, the embodiments of the disclosure are illustrated clearly and comprehensively hereinafter in conjunction with the drawings. Apparently, the described embodiments are only a few rather than all of the embodiments of the present disclosure. All other embodiments obtained by those skilled in the art based on the embodiments of the present disclosure without creative effort fall within the protection scope of the disclosure.

The First Embodiment

Referring to FIG. 1, a method for controlling intelligent home based on linkage rules is provided according to a first embodiment of the disclosure. The method includes steps S101-S104.

In step S101, a first linkage rule is executed based on a first parameter of a first condition device to control a first response device to be in a first state;

In step S102, it is determined that the first response device switches from the first state to a second state different from the first state;

In step S103, the first linkage rule is disabled;

In step S104, a second linkage rule is determined among multiple linkage rules based on the second state of the first response device, where execution of the second linkage rule results in the first response device to be in the second state;

In step S105, a third linkage rule is set, where the third linkage rule is to recover the first linkage rule when executing the second linkage rule.

According to this embodiment of the disclosure, the method for controlling intelligent home based on the linkage rules may be applied to a central control device, such as gateway, intelligent router, or cloud, or may be applied to other electronic devices having processing function to control other connected devices through the gateway, intelligent router, or cloud, such as air conditioner, refrigerator, and lamp.

According to this embodiment of the disclosure, step S101 is executed first: executing the first linkage rule based on the first parameter of the first condition device to control the first response device to be in the first state.

Figure 2:
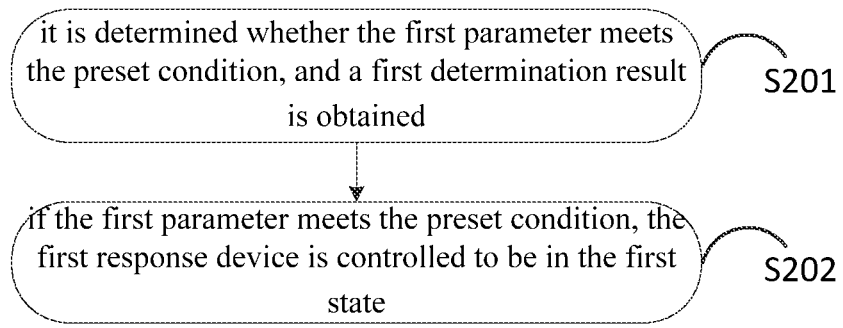
FIG. 2 is a flowchart of implementation of step S101 in the method for controlling intelligent home based on linkage rules according to the first embodiment of the disclosure.

Referring to FIG. 2, the implementation process of step S101 includes steps S201-S202.

In step S201, it is determined whether the first parameter meets the preset condition, and a first determination result is obtained;

In step S202, if parameter meets the preset condition, the first response device is controlled to be in the first state.

According to this embodiment of the disclosure, the first condition device and the first response device are both intelligent appliances, and are both connected to the central control device. The first condition device may be devices such as door and window, humidifier, and refrigerator, or may be a first sensor used to acquire a first environmental parameter of the environment where the first condition device locates; the second condition device may be devices such as air conditioner, refrigerator, and lamp, or may be a second sensor used to acquire a second environmental parameter of the environment which the first response device locates. According to this embodiment of the disclosure, if a rule is set as turning off the air conditioner when the door and window are opened, the door and window serve as the first condition device, and the air conditioner serves as the first response device; if a rule is set as closing the door and window when the air conditioner is turned on, in this case the air conditioner which is the first response device in the former case serves as the first condition device, and the door and window serve as the first response device. According to this embodiment of the disclosure, the relationship between the first condition device and the first response device is relative but not absolute, and a certain device is determined to be the first condition device or the first response device based on the preset rule.

According to this embodiment of the disclosure, the first parameter may be the state of the first condition device, which is a device different from the first response device in the scenario where the first response device locates except for the central control device, for example, the door and window are in an opened state or a closed state; or the first parameter may be the first environmental parameter in the scenario where the first condition device locates, which is acquired by the first condition device, for example, temperature, light intensity, or air humidity of the scenario where the first condition device locates, or another environmental parameter.

After the first parameter is obtained, it is determined whether the first parameter meets the preset condition, for example:

in a case that the obtained first parameter is the first device state of the first condition device, it is determined whether the first device state meets the preset device state, and a first determination result is obtained; or in a case that the obtained first parameter is the first environmental parameter, it is determined whether the first environmental parameter meets the preset environmental parameter, and the first determination result is obtained.

In a case that the first determination result is yes, the first response device is controlled to be in the first state. According to this embodiment of the disclosure, the first linkage rule may be set as: turning off the air conditioner when the door and window are opened; or turning on the air conditioner when the door and window are opened. The first state of the first response device varies with different linkage rules.

After step S101, step S102 is executed: determining that the first response device switches from the first state to the second state different from the first state.

The implementation process of step S102 includes:

allowing the switch of the first response device from the first state to the second state after executing the first linkage rule to be a result generated from a user intervening the first response device.

According to this embodiment of the disclosure, the case that the first linkage rule is set as turning off the air conditioner when the door and window are opened is taken for example, when the first linkage rule is executed, the first state of the air conditioner which is the first response device is an off-state, there are the following two methods to implement the switch of the first response device from the first state to the second state.

In the first method, the user of first response device intervenes the first response device directly, for example, when the first rule is executed and the first state of the first response device is the off-state, the user of first response device may turn the air conditioner on directly, and at this moment the first response device switches from the first state to the second state different from the first state.

In the second method, the user of the first response device may control the first response device through another electronic device, for example, control the first response device to be in the second state through cell phone, PAD, remote control, etc., that is, control the first response device to be in an on-state.

After the first response device switches from the first state to the second state, i.e., after step S102, step S103 is executed: disabling the first linkage rule.

In the implementation process, the first linkage rule is disabled when the state of first response device changes, i.e., even if the first parameter of the first condition device meets the preset condition, the first linkage rule is not executed until the first linkage rule is recovered.

After the first linkage rule is recovered, i.e., after step S103, step S104 is executed: determining the second linkage rule among multiple linkage rules based on the second state of the first response device, where execution of the second linkage rule results in the first response device to be in the second state.

Figure 3:
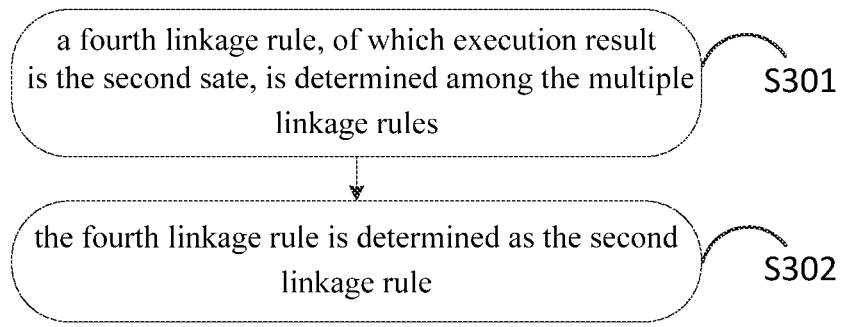
FIG. 3 is a flowchart of implementation of step S104 in the method for controlling intelligent home based on linkage rules according to the first embodiment of the disclosure.

Referring to FIG. 3, the implementation process of step S104 includes steps S301-S302.

In step S301, a fourth linkage rule, of which execution result is the second state, is determined among the multiple linkage rules;

in step S302, the fourth linkage rule is determined as the second linkage rule.

In the implementation process, a plurality of linkage rules may be included in the central control device, such as turning off the air conditioner if the door and window are opened or turning on the air conditioner if the door and window are closed, and after the first response device switches from the first state to the second state, i.e., the air conditioner switches from off-state to on-state, multiple linkage rules are traversed to find the linkage rule with a corresponding execution result that the state of first response device is the on-state. After finding the rule, the rule is determined as the second linkage rule.

After step S104, step S105 is executed: setting the third linkage rule, where the third linkage rule is to recover the first linkage rule when executing the second linkage rule.

In the implementation process, the third linkage rule is set after the second linkage rule is determined, for the purpose of recovering the first linkage rule. Hence the execution of the second linkage rule is taken as the condition, i.e., when the second linkage rule is executed, the first linkage rule is recovered.

Figure 4:
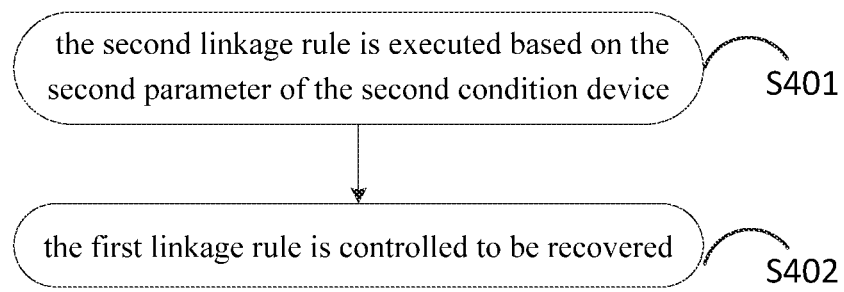
FIG. 4 is a flowchart of implementation of steps following step S105 in the method for controlling intelligent home based on linkage rules according to the first embodiment of the disclosure.

Referring to FIG. 4, after executing step S105, the method further includes steps S401-S402.

In step S401, the second linkage rule is executed based on a second parameter of a second condition device.

In step S402, the first linkage rule is controlled to be recovered.

In the implementation process, the second condition device may be the same as the first condition device, or may be different from the first condition device.

In the implementation process, in a case that the second condition device is the same as the first condition device, the second parameter is the device state of the first condition device, such as the opened-state and closed-state of the door and window. In the implementation process, the first linkage rule is set as turning off the air conditioner if the door and window are opened and turning on the air conditioner if the door and window are closed, thus, the first parameter for executing the first linkage rule is the device state of the first condition device, i.e., opened-state of the door and window, and the second parameter for executing the second linkage rule is also the device state of the first condition device, i.e, the closed-state of door and window.

In the implementation process, in a case that the second condition device is different from the first condition device, the second parameter may be the environmental parameter of the environment where the first response device currently locates. The current environmental parameter may be obtained through the second condition device with a sensor element, and the second condition device and the first condition device are different condition devices in this case.

After step S402, the method further includes:

deleting the third linkage rule.

In the implementation process, the third linkage rule is deleted when the second linkage rule is executed. According to the embodiment of the disclosure, the third linkage rule may not be deleted, and when the second linkage rule is executed, the third linkage rule is disabled. In this case, a new linkage rule needs to be introduced, i.e., when the first linkage rule is disabled, the third linkage rule is recovered, to ensure that the third linkage rule can be executed after the first response device is intervened manually.

The central control device according to the embodiment of the disclosure may be gateway, intelligent router, or cloud, so the intelligent device may be controlled through gateway or intelligent router, or though cloud, or through the cooperation of gateway, intelligent router and cloud. The three situations will be illustrated in detail according to the embodiment of the disclosure.

I. Controlling Intelligent Appliance Through Gateway or Intelligent Router

In the implementation process, a plurality of linkage rules are stored in the gateway or intelligent router. The gateway or intelligent router has a sensor unit or an image acquisition unit.

In the implementation process, the first condition device may be device such as door and window, or lamp, or may be a device with the sensor unit which can obtain the first environmental parameter of the environment where the first response device locates.

1. According to the embodiment of the disclosure, the case that the door and window serve as the first condition device and the air conditioner serves as the first response device is taken for example. The door and window and the air conditioner all have the ability of receiving signal and transmitting signal, and are connected to the gateway or intelligent router. In a case that the gateway acquires through the image acquisition unit that the door and window, i.e., the first condition device, is in the opened-state, the gateway or intelligent router executes the first rule based on the acquired state of the door and window, and transmits a control instruction to the air conditioner which is the first response device. After receiving the control instruction, the air conditioner is controlled to be in the first state.

When the air conditioner is in the first state, the user of air conditioner may want to turn on the air conditioner for some reasons. At the moment, the user may turn on the air conditioner manually, or the user of air conditioner may turn on the air conditioner through an electronic device such as smart phone, remote control or PAD.

After the air conditioner is turned on, the gateway or intelligent router detects that the air conditioner is in the on-state currently, and disables the first linkage rule is at this moment.

After the first linkage rule is disabled, the gateway or intelligent router finds out, among the stored multiple linkage rules, a linkage rule of which the execution result is that the state of the first response device is the on-state, and uses the linkage rule as the second linkage rule: turning on the air conditioner if the door and window are closed.

After the second linkage rule is determined, the gateway or intelligent router sets the third linkage rule: recovering the first linkage rule when executing the second linkage rule. Thus, when the first linkage rule is recovered, the third linkage rule is deleted.

2. According to the embodiment of the disclosure, in a case that the first condition device is the device with sensor unit, after the first condition device obtains the first environmental parameter, for example, the current temperature is 5 degrees Celsius, the first environmental parameter is transmitted to the gateway or intelligent router. After obtaining the first environmental parameter, the gateway determines whether the first environmental parameter meets the preset condition. In case of positive determination, the first rule is executed, and the control instruction is transmitted to the air conditioner which is the first response device. After receiving the control instruction, the air conditioner is controlled to be in the first state.

When the air conditioner is in the first state, the user of air conditioner may want to turn on the air conditioner for some reasons. At the moment, the user may turn on the air conditioner manually, or the user of air conditioner may turn on the air conditioner through an electronic device such as smart phone, remote control or PAD.

After the air conditioner is turned on, the gateway or intelligent router detects that the air conditioner is in the on-state currently, and disables the first linkage rule at the moment.

After the first linkage rule is disabled, the gateway or intelligent router finds out, among the stored multiple linkage rules, a linkage rule of which the execution result is that the state of the first response device is the on-state, and uses the linkage rule as the second linkage rule: turning on the air conditioner if the door and window are closed.

After the second linkage rule is determined, the gateway or intelligent router sets the third linkage rule: recovering the first linkage rule when executing the second linkage rule. Thus, when the first linkage rule is recovered, the third linkage rule is deleted.

II. Controlling Intelligent Appliance Through Cloud

In the implementation process, if the intelligent home is controlled through cloud, the intelligent home needs to establish a connection to the cloud through gateway or intelligent router. The gateway or intelligent router only has the function of providing routing address, and the multiple linkage rules are stored in the cloud.

1. According to the embodiment of the disclosure, when the door and window which serve as the first condition device are in the opened-state, the first condition device transmits the opened-state to the cloud. After receiving the first parameter, the cloud executes the first linkage rule, and transmits the control instruction to the air conditioner which is the first response device through gateway or intelligent router. After receiving the control instruction, the air conditioner is controlled to be in the first state.

When the air conditioner is in the first state, the user of air conditioner may want to turn on the air conditioner for some reasons. At the moment, the user may turn on the air conditioner manually, or the user of air conditioner may turn on the air conditioner through an electronic device such as smart phone, remote control or PAD.

After the air conditioner is turned on, the cloud receives related parameter information that the air conditioner is in the on-state, and disables the first linkage rule at the moment.

After the first linkage rule is disabled, the cloud finds out, among the stored multiple linkage rules, the linkage rule of which the execution result is that the state of the first response device is the on-state, and uses the linkage rule as the second linkage rule: turning on the air conditioner if the door and window are closed.

After the second linkage rule is determined, the cloud sets the third linkage rule: recovering the first linkage rule when executing the second linkage rule. Thus, when the first linkage rule is recovered, the third linkage rule is deleted.

2. According to the embodiment of the disclosure, in a case that the first condition device is the device with sensor unit, after the first condition device obtains the first environmental parameter, for example, the current temperature is 5 degrees Celsius, the first environmental parameter is transmitted to the cloud. After obtaining the first environmental parameter, the cloud determines whether the first environmental parameter meets the preset condition. In case of positive determination, the first rule is executed, and the control instruction is transmitted to the air conditioner which is the first response device. After receiving the control instruction, the air conditioner is controlled to be in the first state.

When the air conditioner is in the first state, the user of air conditioner may want to turn on the air conditioner for some reasons. At the moment, the user may turn on the air conditioner manually, or the user of air conditioner may turn on the air conditioner through an electronic device such as smart phone, remote control or PAD.

After the air conditioner is turned on, the cloud receives related parameter information that the air conditioner is in the on-state, and disables the first linkage rule at the moment.

After the first linkage rule is disabled, the cloud finds out, among the stored multiple linkage rules, the linkage rule of which the execution result is that the state of the first response device is the on-state, and uses the linkage rule as the second linkage rule: turning on the air conditioner if the door and window are closed.

After the second linkage rule is determined, the cloud sets the third linkage rule: recovering the first linkage rule when executing the second linkage rule. Thus, when the first linkage rule is recovered, the third linkage rule is deleted.

III. Controlling Intelligent Home Through Cooperation of Gateway or Intelligent Router Together with Cloud In the implementation process, the multiple linkage rules are stored in the cloud, the intelligent device is connected to the cloud through gateway or intelligent router. According to the embodiment of the disclosure, the gateway or intelligent router has not only the function of providing routing address, but also the processing capacity.

1. According to the embodiment of the disclosure, the case that the door and window serve as the first condition device and the air conditioner serves as the first response device is taken for example. The door and window, and the air conditioner all have the ability of receiving signal and transmitting signal, and are connected to the gateway or intelligent router. In a case that the gateway acquires through the image acquisition unit that the door and window, i.e., the first condition device, is in the opened-state, related parameter information is transmitted to the cloud, and the cloud executes the first rule after obtaining the state of the door and window, and forwards a control instruction through the gateway or intelligent router. After receiving the control instruction, the air conditioner is controlled to be in the first state.

When the air conditioner is in the first state, the user of air conditioner may want to turn on the air conditioner for some reasons. At the moment, the user may turn on the air conditioner manually, or the user of air conditioner may turn on the air conditioner through an electronic device such as smart phone, remote control or PAD.

After the air conditioner is turned on, the gateway or intelligent router detects that the air conditioner is in the on-state, and transmits the state information that the air conditioner is in the on-state to the cloud. The cloud disables the first linkage rule.

After the first linkage rule is disabled, the cloud finds out, among the multiple linkage rules stored in the cloud, the linkage rule of which the execution result is that the state of the first response device is the on-state, and uses the linkage rule as the second linkage rule: turning on the air conditioner if the door and window are closed.

After the second linkage rule is determined, the gateway or intelligent router sets the third linkage rule: recovering the first linkage rule when executing the second linkage rule. Thus, when the first linkage rule is recovered, the third linkage rule is deleted.

2. According to the embodiment of the disclosure, in a case that the first condition device is the device with sensor unit, after the gateway or intelligent router obtains the first environmental parameter, for example, the current temperature is 5 degrees Celsius, the gateway or intelligent router transmits the first environmental parameter to the cloud. After obtaining the first environmental parameter, the cloud determines whether the first environmental parameter meets the preset condition. In case of positive determination, the first rule is executed, and the control instruction is forwarded to the air conditioner which is the first response device through gateway or intelligent router. After receiving the control instruction, the air conditioner is controlled to be in the first state.

When the air conditioner is in the first state, the user of air conditioner may want to turn on the air conditioner for some reasons. At the moment, the user may turn on the air conditioner manually, or the user of air conditioner may turn on the air conditioner through an electronic device such as smart phone, remote control or PAD.

After the air conditioner is turned on, the gateway or intelligent router detects that the air conditioner is in the on-state, and transmits the state information that the air conditioner is in the on-state to the cloud. The cloud disables the first linkage rule.

After the first linkage rule is disabled, the cloud finds out, among the stored multiple linkage rules, the linkage rule of which the execution result is that the state of the first response device is the on-state, and uses the linkage rule as the second linkage rule: turning on the air conditioner if the door and window are closed.

After the second linkage rule is determined, the cloud sets the third linkage rule: recovering the first linkage rule when executing the second linkage rule. Thus, when the first linkage rule is recovered, the third linkage rule is deleted.

The Second Embodiment

Figure 5:
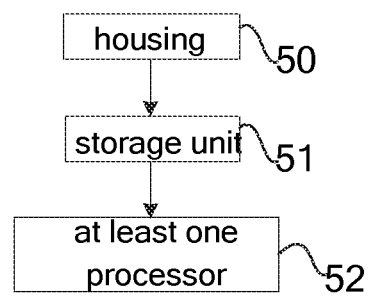
FIG. 5 is a structural diagram of a control device according to a second embodiment of the disclosure.

A control device is provided according to the embodiment of the disclosure, referring to FIG. 5. The control device includes:

a housing 50;

a storage unit 51 provided in the housing, configured to store at least one program module; and at least one processor 52 provided in the housing, where the at least one processor is configured to, through obtaining and running the at least one program module, execute a first linkage rule based on a first parameter of a first condition device to control a first response device to be in a first state; determine that the first response device switches from the first state to a second state different from the first state; disable the first linkage rule; determine a second linkage rule among multiple linkage rules based on the second state of the first response device, where execution of the second linkage rule results in the first response device to be in the second state; and set a third linkage rule, where the third linkage rule is to recover the first linkage rule when executing the second linkage rule.

Optionally, after the processor set the third linkage rule, the at least one processor 52 is configured to:

execute the second linkage rule based on a second parameter of a second condition device; and recover the first linkage rule.

Optionally, after recovering the first linkage rule, the at least one processor 52 is further configured to:

delete the third linkage rule.

Optionally, the at least one processor 52 is further configured to:

determine whether the first parameter meets the preset condition, and obtain a first determination result; and control the first response device to be in the first state if parameter meets the preset condition.

Optionally, the at least one processor 52 is further configured to:

allow the switch of the first response device from the first state to the second state after executing the first linkage rule to be a result generated from a user intervening the first response device.

Optionally, the at least one processor is further configured to:

determine among the multiple linkage rules a fourth linkage rule of which execution result is the second state; and determine the fourth linkage rule as the second linkage rule.

The above one or more technical solutions according to the embodiment of the disclosure, at least have the following one or more technical effects.

Firstly, in the technical solution according to the embodiment of the disclosure, the first linkage rule is executed based on the first parameter of the first condition device to control the first response device to be in the first state; it is determined that the first response device switches from the first state to a second state different from the first state; the first linkage rule is disabled; the second linkage rule is determined among multiple linkage rules based on the second state of the first response device, where execution of the second linkage rule results in the first response device to be in the second state; and the third linkage rule is set. In conventional technology, a user of the electronic device to manually set the recovery, which brings inconvenience in operation to the user; while the electronic device automatically recovers based on the preset time period, the preset time period may be too short or too long in some certain scenarios. By contrast, with the solution of the disclosure, the disabled rule may be automatically recovered based on the scenario of the electronic device, and the technical problem that the conventional electronic device is not able to automatically recover the disabled rule based on the scenario condition of the electronic device after the rule for controlling states of the electronic device is disabled is effectively solved, and the electronic device is able to automatically recover the disabled rule based on the scenario condition of the electronic device.

Secondly, in the technical solution according to the embodiment of the disclosure, the first linkage rule is executed based on the first parameter of the first condition device to control the first response device to be in the first state; it is determined that the first response device switches from the first state to a second state different from the first state; the first linkage rule is disabled; the second linkage rule is determined among multiple linkage rules based on the second state of the first response device, where execution of the second linkage rule results in the first response device to be in the second state; and the third linkage rule is set. Thus the problem that it requires the user of the electronic device to manually set the recovery or the electronic device automatically recovers based on the preset time, which causes poor user experience in the process of using the electronic device, is effectively solved, and the technical effect of saving time and enhancing experience for the user is achieved.

It should be understood by those skilled in the art that, the embodiments according to the present disclosure may be implemented as a method, system or computer program product. Hence, the embodiments of the invention may be implemented with hardware only, with software only, or with a combination of hardware and software. Furthermore, the embodiments of the present disclosure may be implemented in computer program products in the form of computer readable media (including but not limited to magnetic disk storages, optical storages, etc.) storing computer executable codes.

The description in this disclosure is made in conjunction with flowchart(s) and/or block diagram(s) of the method, device (system) or computer program product according to the embodiments of the disclosure. It should be understood that each process in the flowchart and/or each block in the block diagram and any combination of processes and/or blocks in the flowchart and/or the block diagram may be implemented through computer program instructions. The computer instructions may be provided to a processor of a general-purpose computer, dedicated computer, embedded processing machine or any other programmable data processing device to achieve a machine, in which device(s) to implement functions specified in one or more processes of the flowchart and/or one or more blocks of the block diagram is(are) achieved through executing the instructions by the computer or any other programmable data processing device.

The computer program instructions may further be stored in a computer readable storage which may lead the computer or any other programmable data processing device to operation in particular manner in order that a product including an instruction device is generated according to the instructions stored in the computer readable storage, where the instruction device is configured to implement the functions specified in one or more processes of the flowchart and/or one or more blocks of the block diagram.

The computer program instructions may further be loaded to the computer or any other programmable data processing device in order that a series of steps are executed on the computer or any other programmable data processing device to generate processes implemented by the computer, and the steps to implement the functions specified in one or more processes of the flowchart and/or one or more blocks of the block diagram are provided by the instructions executed on the computer or any other programmable data processing device.

Specifically, the computer program instructions corresponding to the method for controlling intelligent home based on the linkage rule according to the embodiments of the disclosure may be stored on storage medium such as optical disk, hard disk, and U-disk. When the computer program instructions corresponding to the method for controlling intelligent home based on the linkage rule are read or executed by an electronic device, the electronic device is enabled to perform the following steps:

executing a first linkage rule based on a first parameter of a first condition device to control a first response device to be in a first state;

determining that the first response device switches from the first state to a second state different from the first state;

disabling the first linkage rule;

determining a second linkage rule among multiple linkage rules based on the second state of the first response device, where execution of the second linkage rule results in the first response device to be in the second state; and setting a third linkage rule, where the third linkage rule is to recover the first linkage rule when executing the second linkage rule.

Optionally, once the instructions are read or executed by the electronic device, the electronic device is enabled to perform: after setting the third linkage rule, recovering the first linkage rule.

Optionally, once the instructions are read or executed by the electronic device, the electronic device is enabled to perform: after recovering the first linkage rule, deleting the third linkage rule.

Optionally, once the instructions are read or executed by the electronic device, the electronic device is enabled to perform: for executing the first linkage rule based on the first parameter of the first condition device to control the first response device to be in the first state, determining whether the first parameter meets the preset condition, and obtaining a first determination result; and control the first response device to be in the first state if parameter meets the preset condition.

Optionally, once the instructions are read or executed by the electronic device, the electronic device is enabled to perform: for determining that the first response device switches from the first state to the second state different from the first state, allowing the switch of the first response device from the first state to the second state after executing the first linkage rule to be a result generated from a user intervening the first response device.

Optionally, once the instructions are read or executed by the electronic device, the electronic device is enabled to perform: for determining the second linkage rule among multiple linkage rules based on the second state of the first response device, determining a fourth linkage rule of which execution result is the second state among the multiple linkage rules; and determining the fourth linkage rule as the second linkage rule.

Though preferred embodiments are described, those skilled in the art may make other changes and modifications to the embodiments once a basic concept of creativity is known. Thus, the appended claims are intended to be explained to include the preferred embodiments and all changes and modifications within the scope of the disclosure.

Apparently, those skilled in the art may make various changes and modifications to the disclosure without departing from the spirit and scope of the disclosure. Thus, if the changes and modifications of the disclosure fall within the scope of the claims of the disclosure and comparable technology thereof, the disclosure intends to include the changes and modifications.

What is claimed is:

1. A method for controlling an intelligent device, comprising:

determining whether a first parameter of a first condition device meets a preset condition;

determining a first linkage rule to control a first response device to be in a first state if the first parameter meets the preset condition;

determining that the first response device switches from the first state to a second state, wherein the second state is different from the first state;

disabling the first linkage rule, wherein in a case of disabling the first linkage rule, when the first parameter of the first condition device meets the preset condition, the first linkage rule is not executed;

determining a second linkage rule among a plurality of linkage rules based on the second state of the first response device, wherein the second linkage rule is executable to control the first response device to enter into the second state;

setting a third linkage rule, wherein the third linkage rule is defined to recover the first linkage rule when executing the second linkage rule based on a second parameter of a second condition device;

deleting or disabling the third linkage rule, when the second linkage rule is executed, wherein in a case of disabling the third linkage rule, a fourth linkage rule is set, wherein the fourth linkage rule is executable to recover the third linkage rule when the first linkage rule is disabled;

executing the fourth linkage rule to recover the third linkage rule;

executing the third linkage rule to recover the first linkage rule; and executing the first linkage rule based on the first parameter of the first condition device to control the first response device to be in the first state if the first parameter meets the preset condition.

2. The method according to claim 1, wherein determining that the first response device switches from the first state to the second state comprises:

after executing the first linkage rule, switching the first response device from the first state to the second state through user intervention.

3. The method according to claim 1, wherein:

the first response device is an air conditioner; and the first condition device is one of:

a door, a window, a humidifier, and a refrigerator.

4. The method according to claim 1, wherein the first condition device and the first response device are interchangeable.

5. A control device, comprising:

a housing;

a storage for storing at least one program module; and at least one processor provided in the housing, wherein, through running the at least one program module, the at least one processor is configured to:
  determine whether a first parameter of a first condition device meets a preset condition;
  determine a first linkage rule to control a first response device to be in a first state if the first parameter meets the preset condition;
  determine that the first response device switches from the first state to a second state, wherein the second state is different from the first state;
  disable the first linkage rule, wherein in a case of disabling the first linkage rule, when the first parameter of the first condition device meets the preset condition, the first linkage rule is not executed;
  determine a second linkage rule among a plurality of linkage rules based on the second state of the first response device, wherein the second linkage rule is executable to control the first response device to enter into the second state;
  set a third linkage rule, wherein the third linkage rule is defined to recover the first linkage rule when executing the second linkage rule based on a second parameter of a second condition device;
  delete or disable the third linkage rule, when the second linkage rule is executed, wherein in a case of disabling the third linkage rule, a fourth linkage rule is set, wherein the fourth linkage rule is executable to recover the third linkage rule when the first linkage rule is disabled;
  execute the fourth linkage rule to recover the third linkage rule;
  execute the third linkage rule to recover the first linkage rule; and
  execute the first linkage rule based on the first parameter of the first condition device to control the first response device to be in the first state if the first parameter meets the preset condition.

6. The control device according to claim 5, wherein the at least one processor is further configured to:
  after executing the first linkage rule, switch the first response device from the first state to the second state upon user intervention.

7. The control device according to claim 5, wherein:
the first response device is an air conditioner; and
the first condition device is one of:
  a door,
  a window,
  a humidifier, and
  a refrigerator.

8. The control device according to claim 5, wherein the first condition device and the first response device are interchangeable.

9. A non-transitory computer readable storage medium having stored therein computer program instructions which, when executed by a control device, cause the control device to perform:
  determining whether a first parameter of a first condition device meets a preset condition;
  determining a first linkage rule to control a first response device to be in a first state if the first parameter meets the preset condition;
  determining that the first response device switches from the first state to a second state, wherein the second state is different from the first state;
  disabling the first linkage rule, wherein in a case of disabling the first linkage rule, when the first parameter of the first condition device meets the preset condition, the first linkage rule is not executed;
  determining a second linkage rule among a plurality of linkage rules based on the second state of the first response device, wherein the second linkage rule is executable to control the first response device to enter into the second state;
  setting a third linkage rule, wherein the third linkage rule is defined to recover the first linkage rule when executing the second linkage rule based on a second parameter of a second condition device;
  deleting or disabling the third linkage rule, when the second linkage rule is executed, wherein in a case of disabling the third linkage rule, a fourth linkage rule is set, wherein the fourth linkage rule is executable to recover the third linkage rule when the first linkage rule is disabled;
  executing the fourth linkage rule to recover the third linkage rule;
  executing the third linkage rule to recover the first linkage rule; and
  executing the first linkage rule based on the first parameter of the first condition device to control the first response device to be in the first state if the first parameter meets the preset condition.

10. The non-transitory computer readable storage medium according to claim 9, wherein:
the first response device is an air conditioner; and
the first condition device is one of:
  a door,
  a window,
  a humidifier, and
  a refrigerator.

11. The non-transitory computer readable storage medium according to claim 9, wherein the first condition device and the first response device are interchangeable.

* * * * *